3 Sheets—Sheet 1.

G. P. GORDON.

PRINTING PRESS.

No. 688. Reissued Apr. 12, 1859.

THE NORRIS PETERS CO., PHOTO-LITHO., WASHINGTON, D. C.

G. P. GORDON.

PRINTING PRESS.

No. 688. Reissued Apr. 12, 1859.

THE NORRIS PETERS CO., PHOTO-LITHO., WASHINGTON, D. C.

G. P. GORDON.

PRINTING PRESS.

No. 688. Reissued Apr. 12, 1859.

THE NORRIS PETERS CO., PHOTO-LITHO., WASHINGTON, D. C.

UNITED STATES PATENT OFFICE.

GEORGE P. GORDON, OF NEW YORK, N. Y.

IMPROVEMENT IN PRINTING-PRESSES.

Specification forming part of Letters Patent No. 20,874, dated July 13, 1858; Reissue No. 688, dated April 12, 1859.

*To all whom it may concern:*

Be it known that I, GEORGE P. GORDON, of New York, in the county and State of New York, have invented a new and Improved Printing-Press; and I do hereby declare the following is a full, clear, and exact description thereof, reference being had to the annexed drawings and figures of reference thereon, the same marks of reference always denoting the same part in all the figures of the drawings.

Figure 1:
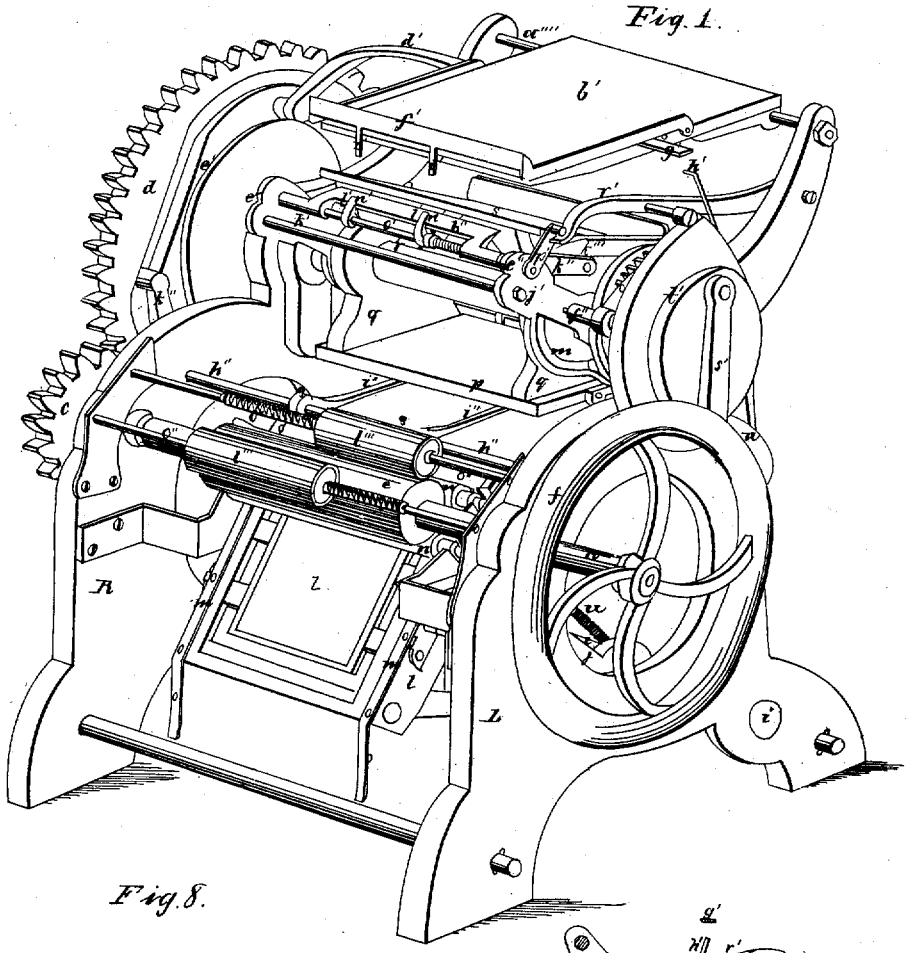
Figure 8:
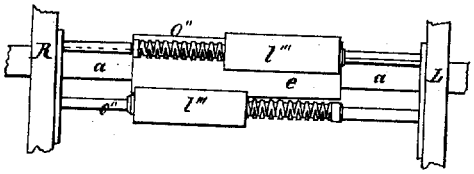
Figure 6:
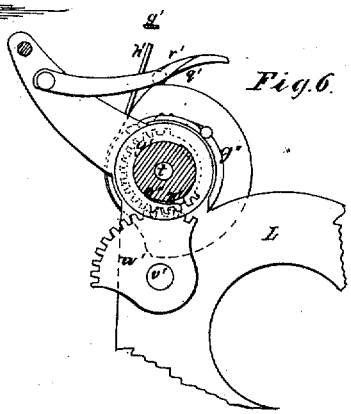
Figure 2:
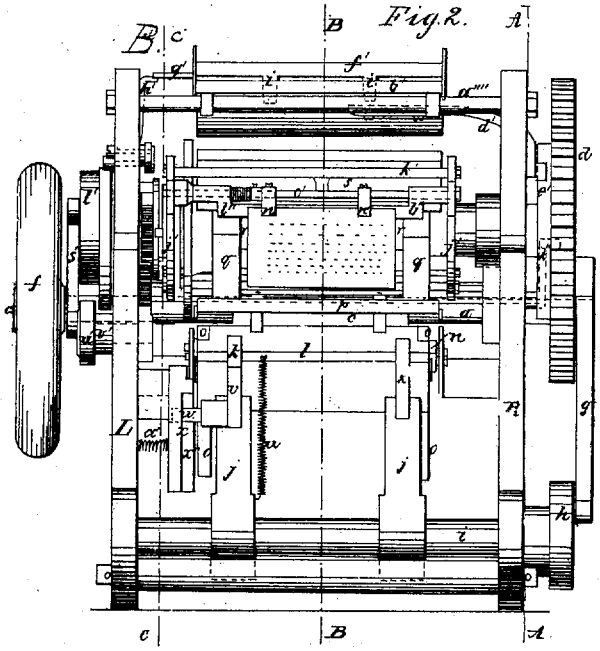
Figure 3:
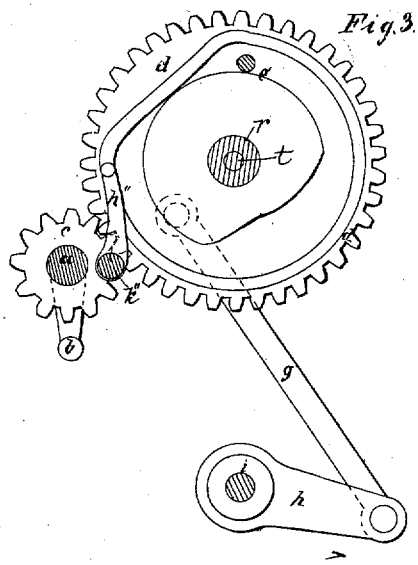
Figure 4:
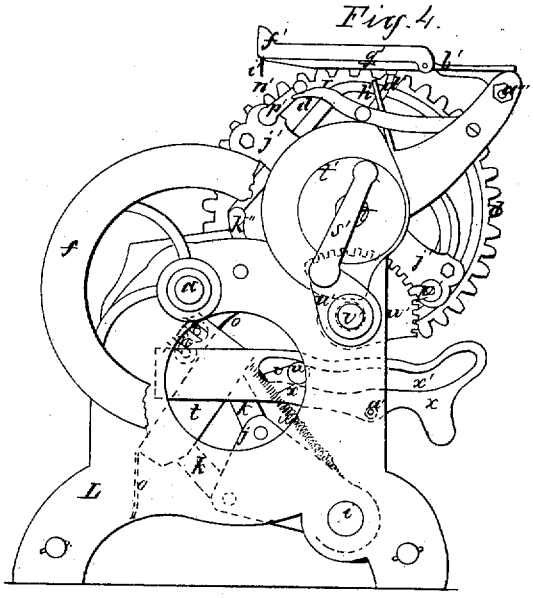
Figure 5:
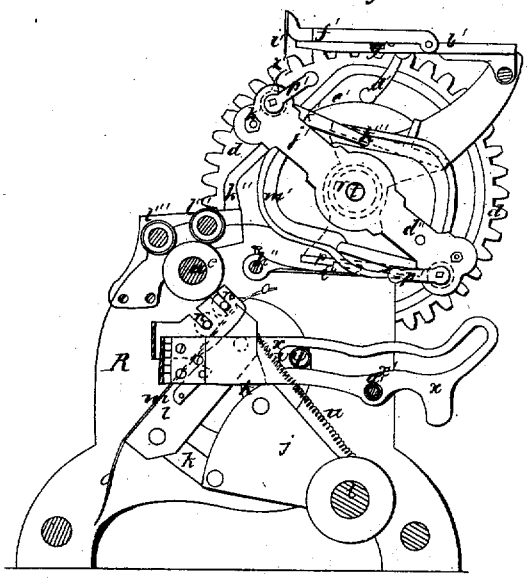
Figure 7:
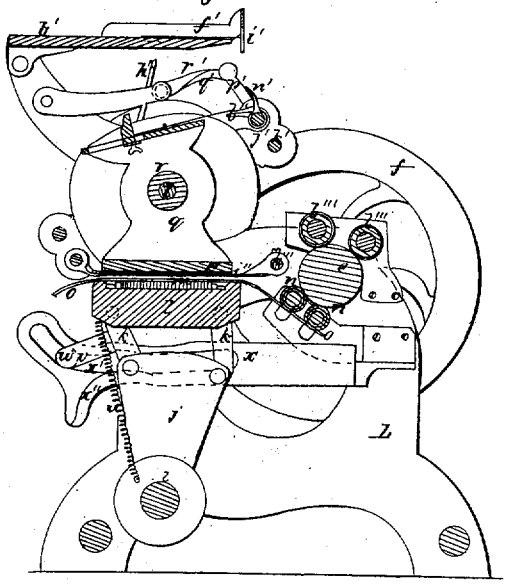

In the drawings, Figure 1 is a perspective view taken at the back of the machine, or opposite where the person feeding the paper is to stand. This shows the guides to lay the sheet against and the grippers about to take the laid sheet, the platen with the spring-strips to hold the sheet up to the platen while the impression is being taken and until the the form of types has relieved itself from the sheet. It also gives the relative positions of the distributing-cylinder, the inking-rollers, and the bed at the time one sheet is about to be received by one set of grippers and the second set of grippers is on its transit toward the place of depositing the sheet of paper after it is printed. These last named operations follow one after the other in rapid succession as the gripper frame or arms revolve on their axis. Fig. 2 is an elevation of the front or feeding side of the machine, and shows the position of all the parts, which may be seen from a plain side view of the press, the red lines A A, B B, and C C showing where the sectional divisions take place; also showing (in red lines) the sheet in its progress toward being deposited on the pile-table, as will be more fully described hereinafter. Fig. 3 is a section outside of the frame, but inside of the gearing and cams, taken, as marked at the line A A, in Fig. 2, near the R side of the frame, showing the hollow cam for controlling the strips for holding the sheets up to the platen, and the outside cam to raise the feed-board and allow it to fall at the proper time. This figure also shows the crank from the main wheel to the rock-shaft of the impression-works through the connecting rod, the dotted lines being to show the parts which would be otherwise hidden from view. Fig. 4 is a view from inside the R side of the frame, showing the position of the several parts from that point in sectional elevation as indicated by letters of reference. Fig. 5 is a view of the interior of the press, taken at the line C C in Fig. 2, indicating the parts as per letters of reference inside the L side of the frame. Fig. 6 is a special section looking from the inside of the L side of the frame, showing that toward the said side of frame the segment of cog-wheels are as named by letters of reference. Fig. 7 is a section through the center of the press, in full elevation, taken as indicated at the line B B, Fig. 2. Fig. 8 is a front view of the distributing-cylinders of the inking apparatus, showing their means of traveling, one across, opposite the other, so as to carry the ink from the center to the ends, and then reverse the motion and return, thus giving extra distribution to the ink.

The nature of my invention consists in: First, the providing a feed-board which, working upon its axis, will vibrate by rising so that the grippers of a revolving grippers-frame may pass underneath the feed-board, said feed-board dropping down at the proper time to give the sheet of paper which has been fed to the gage to the grippers which have just passed from under the feed-board, as here shown, reserving the privilege of changing the arranging the arrangement of parts by some equivalent machinery, or in some change of forms or positions of the parts thereof; second, in providing a revolving frame of grippers, which may alternately stop for the impression and revolve to carry the sheet to be printed, and thence to be delivered in a regularly-piled heap, not intending to confine myself to both these operations, as either of them will be just as well performed separately. Of these sets, one or many sets of grippers may be used in this manner, but I give the preference to two sets, as here shown—the one to be at the impression and the other at the place of delivering the sheet at the pile or fly-board. The sheet is dropped just before the frame stops to allow an impression to be taken. This done, the frame of grippers moves on half a revolution, when one set of grippers occupies the position its predecessor had done—that is, as shown in this model—and so continually onward, one following the other. The sheet of paper, when taken by the grippers from the feed-board, is held by the said grippers until it is desired they should release it, whether this be at the time of the impression or to be piled upon the pile-board.

To enable others skilled in the art to make and use my invention, I will describe its construction and operation.

The driving-shaft *a* has upon it at its end, outside the R side of the frame, a crank or pulleys, as circumstances may require, is placed, by which the whole machine will receive motion. This will be known in the drawings as *b*. The pinion *c* is also outside the frame upon the same shaft, gearing with the main or driving wheel *d*, midway between the frames R and L. Upon the same shaft is the ink-distributing cylinder *e*, and on the opposite end, outside the L side of the frame, is the fly-wheel *f*. Outside of the driving-wheel *d* is attached, by a screw, the connecting-rod *g*, its opposite end connecting with the end of the crank *h*, which is made fast to the shaft of the impression-works *i*. This shaft *i* is a rock-shaft, and has upon it within the frame, placed at equal distances from the center, two other cranks or arms, each parallel with the other and corresponding in their construction, which will be known as *j* in the drawings. Each of these two arms *j* have two connecting rods or links, the one end of these links being fast with the arms and the other to the under side of the bed. Thus the four links or connecting-rods connect with the four corners of the bed, at such points of distance from the center of the bed as shall be known as *k* in the drawings, and the bed as *b*. Two bearers, one for each side of the bed *m*, are made fast to the bed. These extend outward upon both sides of the bed, as seen at Fig. 7. The duty of these bearers is first to hold the inking-rollers *n n* up to the distributing-cylinder E, and the second to keep said rollers from too hardly pressing upon the types when inking them. Upon the side of the bed, at either end, outside the bearers, are placed lugs or projections *o o*, as shown at Figs. 1 and 5. These lugs are to fit with corresponding pieces upon the platen, one fitting into the other so as to keep the bed and platen each parallel to the other at the time of taking the impression, so that neither can vibrate so as to produce a mackle or slur, or other inaccuracy of the impression, and, if necessary, insure perfect register when it is desired to print on both sides or in several colors on the same side of the sheet. The platen *p* is always to occupy a fixed position, and has its braces *q q* fast upon the fixed tube, extending from one to the other, combining them with the fly-board or place where the sheets are deposited as they are regularly dropped by the grippers. The fixed tube is known as *r* in the drawings, and the fly-board as *s*. Projections from the two sides of the frame R and L sustain these parts in their fixed position, while the main shaft *i* passes entirely through the frame on both sides, so as to give motion to the other parts described. It will thus be seen that causing the driving-shaft to revolve drives the main wheel, causes the crank *h* to rock backward and forward, carrying with it the main shaft, and with it the two arms inside of the frame, with the connecting-rods and the bed, by means of a rotating reciprocating motion, thus carrying the bed up to the platen for the purpose of taking the impression, and then, as the shaft rocks in contrary direction, relieves the bed with its form of types, conveying the same in a return movement back under the inking-rollers. Thus the form of types passes and repasses under the inking-rollers at each time of taking an impression. A spring, *u*, or a counter-balance, if necessary, may be used to insure the falling of the bed at the proper time, after the impression, if it shall be found not sufficient of its own weight. Upon one of the connecting-rods *j*, which for this purpose I will call *j'*, is an arm extending from its side toward the front of the press. This arm will be known as *v*, and has upon its side a stud with its frictionless roller *w*, to fit in the double cam *x*, and this for the purpose of throwing the impression off and on at the will of the operator or person using the press. The double cam *x* is made with a slot or hollow cam, of the shape to follow the movement of the bed and its attachments. (See *x* in Fig. 5.) It has also a raised part upon which the roller *w* will rest and be guided back into the cam *x'*, (this will be seen in Fig. 7,) as *x''*. A stud, fixed in the side of the frame L, extends inward, and having a spiral spring upon it, (see *y*, Fig. 2,) which always presses against the side of the cam *x* to keep it in place at all times, except when it is thrown off the impression, after which the cam *x''* will raise the frictionless roller *w* so that it will by force of the spring *a'* be again thrown into the proper place in *x'*, so that the impressions will continue to be made until it may again be thrown out of gear. This vibrating double cam may be thrown backward and forward by a common lever to throw the impression on and off. This lever is not shown, as it is a common instrument, and its form may be changed to suit circumstances.

The inking-rollers, with the main distributing-cylinders, are of common construction, held in place so that the distributing-cylinder *e* (the inking-rollers being *n*) may carry the ink to the inking-rollers, which, in their turn, pass it to the form of types. These distributing-rollers are half the length of the main distributing-cylinder. The ink and friction cause these to revolve upon the cylinder *e'''*. The shaft upon which these vibrating distributing-rollers revolve is formed in a cross-cut right and left hand screw, having a fork to work upon said screw, which will cause it to travel endwise, as it revolves, to a given distance, or its full length, when a stop reverses the fork and it again travels in the opposite endwise direction, thus continually traveling in one direction or the other. Two or more of these short or half-length rollers may be used, so that in crossing each other the ink will be carried from the end to the center, and, in reverse, carry it from the center to the end, thus completely distributing the ink to all parts of the distributers. These half-rollers will be known as $l'''$ and the screw-shaft as $o''$. As this screw and fork is a common device, further description seems unnecessary. Upon the upper part of the bed, at either end, are the two bearers, which prevent the impression from being stronger than intended. These bearers extend on either side of the bed, and there become springs, in a cam-like form, to hold the inking-rollers up to the distributer when the form is out from under the impression, and govern these rollers in all their relations to the form and the distribution. They will be known as *o o* in the drawings.

Having divided my Patent No. 20,874, bearing date July 13, 1858, I will not here introduce new drawings or new references thereon, but will name the following as the references which will be found in my amended specification No. 2 of this reissue on the before-named patent, where the parts referred to will be found fully explained, viz: Feed-board $b'$, main shaft $t$, feed-board gage $f'$, gage-points $i'$, fixed tube $r$, frame for grippers $j'$, connecting-rod for grippers $k'$, grippers $l'$, shaft $a'''$, base of grippers $l''$, finger-grippers $n'$, stud $h'$, gripper-arms $k''$, stud $k'''$, cam $m'$, shaft $o'$, crank $w'$, shaft $v'$, segment $y'$, pawl $z'$, spring $c'''$, fixture $d''$, springs $e''$, tube $f''$, cam $k''$, gage $x'''$, spring-strips $i''$, rock-shaft $p''$, connecting-rod $s'$, cam $e'$, lever-cam $g'$, arm $g''$, outside cam $r'$, wheel $t'$.

Operation: The sheet of paper having been presented to the impression, (as indicated or described in Reissue No. 2, referred to,) and received its impression, and been relieved from the form as well as the spring-strips or frisket, is by the next move of the grippers conveyed to its place of deposit, where it is dropped on the pile upon the pile or fly-board, as hereinbefore described in Reissues Nos. 1 and 2 for the Patent No. 20,874, dated July 13, 1858. A double cam will throw off or on the impression, as hereinbefore described. For the purpose of insuring the most perfect union of the bed and platen at the time of the impression, a sort of male stud is placed upon one, and a female upon the bed or the platen is arranged to receive and fit the male referred to. This, with the confined position of the arms of the gripper-frame, renders the impression perfect, free from slurs, mackles, or other imperfection, either in register or otherwise. The inking apparatus has been described sufficient for the purpose. It will be quite easy to arrange the bed or platen so that one or both of them may be turned over for the purpose of conveniently making the form ready, so as to overlay or underlay, as the case may require.

Having thus fully described my invention, what I claim as new is—

1. The combination and arrangement of the feed-table, the fly or pile-board, the platen and bed with the set or sets of independent revolving nippers or grippers, for the purposes described.

2. The fly-board, with its adjustable gage or guide, in combination with the grippers or nippers, to insure the even piling of the sheets of paper, or their equivalents, whatever the size of sheet may be.

3. The vibrating double cam for throwing off and on the impression.

4. Two or more distributing-rollers having a lateral motion upon a main distributer, which shall move independent of and in an opposite direction to each other, and thus alternately cross and recross each other's distribution, for the purpose of giving a uniform inking to the form; also, the two distributions given to the inking-rollers upon one cylinder for each impression, (heretofore patented by me,) in combination with the rotating reciprocating bed with the spring extensions attached, all of which is herein described and set forth.

GEO. P. GORDON.

Witnesses:
J. L. KINGSLEY,
A. TURNER.